April 16, 1957 R. G. DENNYS 2,788,674
ADJUSTING MECHANISM FOR ELIMINATING BEVEL GEAR BACKLASH
Filed Dec. 2, 1955

INVENTOR
R. G. DENNYS
BY
Maybee & Legris
ATTORNEYS

United States Patent Office 2,788,674
Patented Apr. 16, 1957

2,788,674

ADJUSTING MECHANISM FOR ELIMINATING BEVEL GEAR BACKLASH

Ronald Greville Dennys, Brampton, Ontario, Canada, assignor to Orenda Engines Limited, Village of Malton, Ontario, Canada, a corporation Application December 2, 1955, Serial No. 550,681

5 Claims. (Cl. 74—400)

This invention relates to gear mountings and in particular to gear mountings for bevel gears.

Bevel gears of the commonest type have an annular toothed face which lies at an angle of 45° to the axis of rotation of the gear. In order to mesh two bevel gears it is therefore necessary that their axes be placed at an angle of 90° to one another and adjusted axially until the teeth of the gears engage each other. Difficulty is, however, experienced in maintaining the gears in perfect mesh as it is not always possible to effect axial displacement of the gear shaft once the mechanism has been assembled. If the gears are imperfectly meshed due to inaccuracies in the original assembly or to wear of the gears during operation, the driven gear will have a tendency to lag behind the driving gear during acceleration and to overrun the driving gear during deceleration. This difference in speed between the driving and driven gear is known as "backlash."

It will be readily appreciated that in machines where any degree of precision is required, backlash in bevel gears must be eliminated to the greatest possible extent. Heretofore it has been the practice to assemble the mechanism and to then adjust the position of the gears on their respective shafts by means of shims inserted between the rear face of the gear and the face of the shaft bearing. This is a cumbersome and time consuming method and does not readily permit the very fine adjustment which is necessary in high precision machines.

It is an object of the present invention to provide a mechanism whereby bevel gears can be simply and quickly adjusted into perfect mesh.

It is a further object to provide a gear assembly which can be so adjusted without the use of shims or equivalent members.

According to the present invention a gear mounting comprises a sleeve freely rotatable in a bearing, the sleeve being internally threaded at one end and internally splined at the other end, a gear having a hollow, externally threaded boss adapted to engage the internal threads on the sleeve, the interior of the boss being splined to receive a splined plug engaging both the splines in the sleeve and the splines in the boss.

In the accompanying drawings the preferred embodiment of the invention is illustrated, like parts being designated by like reference numerals in the various views of which:

Figure 1:
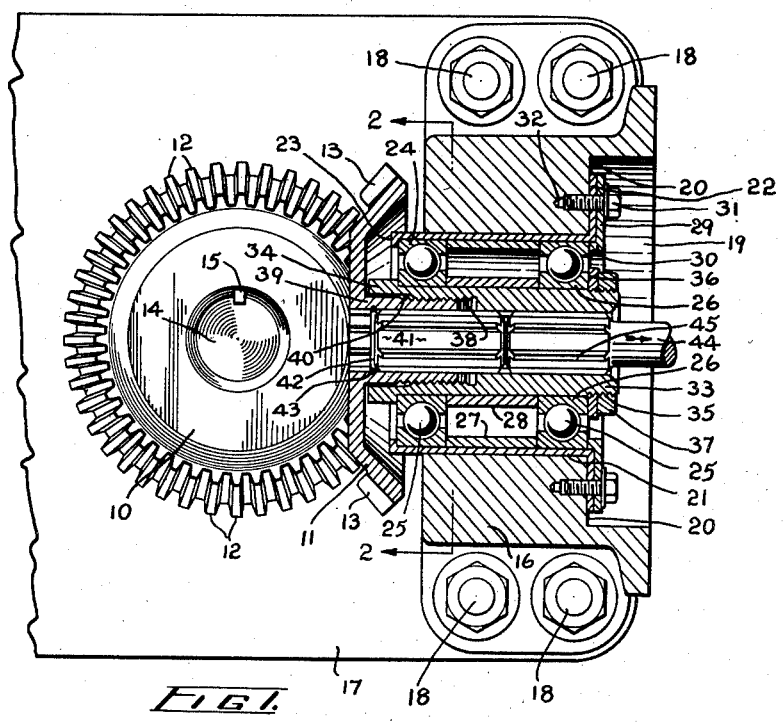
Fig. 1 is a side elevation, partly in cross-section of the gear assembly.
Figure 2:
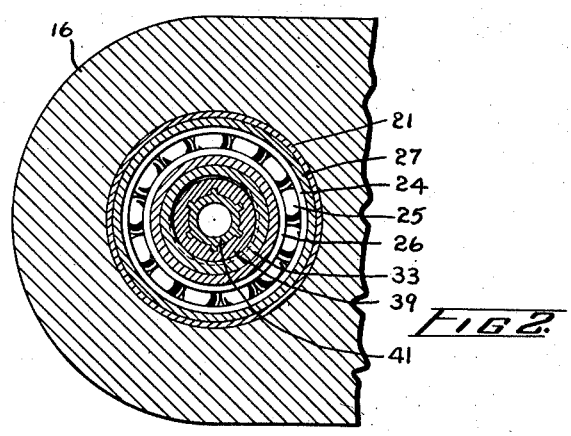
Fig. 2 is a section through 2—2 of Fig. 1.

Referring now to the accompanying drawings it will be seen that two bevel gears 10 and 11 having teeth 12 and 13 are meshed with one another, the gears lying in planes at 90° to one another. Gear 10 is mounted on shaft 14 and held against rotation relative thereto by means of key 15. Shaft 14 may be supported by a conventional bearing which is not shown. Gear 11 is mounted in an adjustable bearing assembly made according to the present invention which is supported in a block 16 secured to a support 17 by means such as bolts 18. It is immaterial to the present invention whether gear 10 or 11 is the driving or driven member.

The block 16 has a circular depression 19 in one face thereof having a bottom wall 20. Centrally disposed in bottom wall 20 is a cylindrical cavity passing through the block 16 in which is mounted the bearing assembly.

The bearing assembly comprises a cylindrical outer sleeve 21 which has, at one end an outwardly extending peripheral flange 22 adapted to lie in abutment with bottom wall 20 of depression 19 and at the other end an inwardly extending peripheral flange 23. Two bearings comprising outer races 24, balls 25 and inner races 26 fit within the sleeve 21, one bearing abutting with its inner race on flange 23 while the other bearing lies adjacent the end of sleeve 21 carrying flange 22. Two annular spacer rings 27 and 28 lie between the bearings, ring 27 abutting outer races 24 and ring 28 abutting inner races 26. An annular retaining member 29 lies over flange 22 and has a flange 30 which extends into sleeve 21 to abut the outer edge of outer race 24 of the adjacent bearing to retain it securely within sleeve 21. Retaining member 29 and sleeve 21 are held in position by means of bolts 31 passing through holes in member 29 and flange 21 and threaded into tapped holes 32 in bottom wall 20 of depression 19 in block 16.

Lying within the cylindrical cavity defined by the inner races 26 of the bearings and spacer rings 28 is an inner sleeve 33. Sleeve 33 has, at one end an outwardly extending peripheral flange 34 adapted to bear against the inner race 26 of one bearing and at the other end a set of external screw threads 35. An annular collar 36 is slipped over the threads 35 and into abutment with the inner race 26 of the other bearing and is held in place by retaining nut 37 which engages threads 35. By tightening nut 37 the inner sleeve 33 is held within the bearing and is, of course, free to rotate on the bearing surfaces provided by races 24, balls 25 and races 26.

Sleeve 33 has an axial cavity which is enlarged at the end adjacent gear 10 and is, in this enlarged portion, provided with internal screw threads 38. The remaining narrower portion of the axial cavity is provided with internal splines.

The gear 11 is provided on its rearward face with an axial boss 39 having external threads 40 to engage the threads 38 in the sleeve 33. Boss 39 is hollow and on its internal surface, which is of a diameter equal to the diameter of the splined portion of the sleeve provided with splines adapted to register with the splines in sleeve 33.

When assembling the mechanism, the gear 11 is threaded into sleeve 33 by holding the gear stationary and rotating sleeve 33 until gear 11 is perfectly meshed with gear 10. Relative rotation between gear 11 and sleeve 33 is then continued until the splines in boss 39 register with the splines in sleeve 33. A splined plug 41 is then inserted in sleeve 33 until a portion of its length is within boss 39 and a portion in sleeve 33. A spring retaining ring 42 in an annular groove 43 within boss 39 prevents the plug from passing completely through the assembly. The plug 41 locks the gear 11 and sleeve 33 together against relative rotation and gear 11 is free to rotate with sleeve 33 within the bearing. Shaft 44 having a splined portion 45 fits into the splined cavity in sleeve 33 to connect the gear 11 to the remainder of the machine.

If the gears should, at a later time need adjustment it is merely necessary that the retaining ring 42 and the plug 41 be removed, the gear 11 rotated relative to sleeve 33 in a clockwise or counterclockwise direction to advance or retract it relative to gear 10 to regain a perfect mesh. The plug 41 and spring ring 42 are then replaced to render the assembly operative once more.

From the foregoing description it will be seen that the mesh of the gears can be adjusted with extreme accuracy to eliminate backlash to an extent not previously possible. The adjustment can also be made quickly and simply without disassembling the machine.

While the invention has been described in specific terms it is to be appreciated that minor modifications can be made therein without departing from the spirit and scope of the invention as defined in the appended claims.

What I claim as my invention is:

1. A gear assembly comprising a sleeve freely rotatable in a bearing, the sleeve being internally threaded at one end and internally splined at the other, a gear having a hollow, externally threaded axial boss adapted to engage the internal threads on the sleeve, the interior of the boss being splined to receive a splined plug engaging both the splines in the sleeve and the splines in the boss.

2. A gear assembly comprising a sleeve freely rotatable in a bearing, the sleeve having an internal cavity of larger diameter at one end than at the other, internal screw threads at the larger end and internal splines at the narrower end, a gear having a hollow, externally threaded axial boss adapted to engage the internal threads in the sleeve, the internal diameter of the boss being equal to the internal diameter of the small end of the sleeve, splines cut internally of the boss and adapted to register with the splines in the sleeve and a splined plug adapted to lie within the hollow boss and sleeve overlapping their adjacent edges.

3. A gear assembly comprising a bearing block having an axial cavity, a bearing in said cavity, an inner sleeve rotatable in the bearing and having an axial cavity internally threaded at one end and internally splined at the other, a gear having an externally threaded hollow axial boss adapted to be threaded into the internally threaded end of the inner sleeve, splines cut into the internal surface of the hollow boss and a splined plug adapted to fit within the boss and the inner sleeve overlapping the adjacent edges thereof.

4. A gear assembly comprising a bearing block having an axial cavity, a bearing in said cavity, a cylindrical sleeve freely rotatable in the bearing, the sleeve having an axial cavity of greater diameter at one end than at the other, the end of larger internal diameter being internally threaded and the end of smaller internal diameter being internally splined, a gear having a hollow axial boss externally threaded and internally splined adapted to be screwed into the sleeve, the splines of the boss being adapted to register with the splines of the sleeve, a splined plug lying within the boss and the sleeve to lock the two against relative rotation.

5. A gear assembly comprising a support, a sleeve freely rotatable in the support, the sleeve having an axial bore of greater diameter at one end than at the other, the end of larger internal diameter being internally threaded and the end of smaller internal diameter being internally splined, a gear having a hollow, axially extending externally threaded boss on its rearward face adapted to be threaded into the threaded portion of the sleeve, the bore of the boss being internally splined and of a diameter equal to the internal diameter of the smaller portion of the bore of the sleeve, a splined plug adapted to fit within the boss and the sleeve and a retaining clip seated in an annular groove within the boss to retain the plug therein.

No references cited.